(12) United States Patent
Hiramatsu et al.

(10) Patent No.: US 10,024,199 B2
(45) Date of Patent: Jul. 17, 2018

(54) VARIABLE VALVE MECHANISM OF INTERNAL COMBUSTION ENGINE

(71) Applicants: OTICS CORPORATION, Nishio-shi (JP); TOYOTA JIDOSHA KABUSHIKI KAISHA, Toyota-shi (JP)

(72) Inventors: Naoki Hiramatsu, Nishio (JP); Koki Yamaguchi, Nishio (JP); Masahide Sakurai, Nishio (JP); Motohiro Yuge, Toyota (JP); Masaaki Tani, Toyota (JP)

(73) Assignees: OTICS CORPORATION, Nishio-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 223 days.

(21) Appl. No.: 15/009,444

(22) Filed: Jan. 28, 2016

(65) Prior Publication Data

US 2016/0281546 A1    Sep. 29, 2016

(30) Foreign Application Priority Data

Mar. 24, 2015    (JP) ................. 2015-061354

(51) Int. Cl.
*F01L 1/34* (2006.01)
*F01L 1/12* (2006.01)
(Continued)

(52) U.S. Cl.
CPC ............... *F01L 1/12* (2013.01); *F01L 1/185* (2013.01); *F01L 13/00* (2013.01);
(Continued)

(58) Field of Classification Search
CPC ... F01L 1/12; F01L 1/185; F01L 13/00; F01L 13/0015; F01L 13/0021; F01L 2001/186; F01L 2105/00; F16K 31/524
See application file for complete search history.

(56) References Cited

U.S. PATENT DOCUMENTS 6,823,826 B1 *   11/2004   Sugiura ................. F01L 1/267
                                                        123/90.16

FOREIGN PATENT DOCUMENTS

JP    2001-263015 A    9/2001
JP    2004-027895 A    1/2004
(Continued)

OTHER PUBLICATIONS

Japanese Office Action dated Jun. 15, 2016.

*Primary Examiner* — Zelalem Eshete
(74) *Attorney, Agent, or Firm* — McGinn IP Law Group, PLLC.

(57) ABSTRACT

The present invention provides a variable valve mechanism of an internal combustion engine, which includes an input member, an output member, a slider and a variable device. The output member has internal space formed therein and has a first cutout and a second cutout which are formed at two positions separated from each other in the swing direction so as to extend from an outer periphery of the output member to the internal space, and the input member is mounted in the internal space so as to extend through both inner sides of the first and second cutouts, and is brought into contact with inner side surfaces of the cutouts from both sides in the thrust direction, whereby relative displacement of the input member together with the slider in the thrust direction with respect to the output member is restricted at two positions by the first and second cutouts.

6 Claims, 10 Drawing Sheets

(51) Int. Cl.
     *F16K 31/524*    (2006.01)
     *F01L 1/18*       (2006.01)
     *F01L 13/00*     (2006.01)

(52) U.S. Cl.
    CPC ....... *F01L 13/0015* (2013.01); *F01L 13/0021* (2013.01); *F16K 31/524* (2013.01); *F01L 2001/186* (2013.01); *F01L 2105/00* (2013.01)

(56) References Cited

FOREIGN PATENT DOCUMENTS

| | | |
|---|---|---|
| JP | 2004-183518 A | 7/2004 |
| JP | 2007-192044 A | 8/2007 |
| JP | 2008-025418 A | 2/2008 |

\* cited by examiner

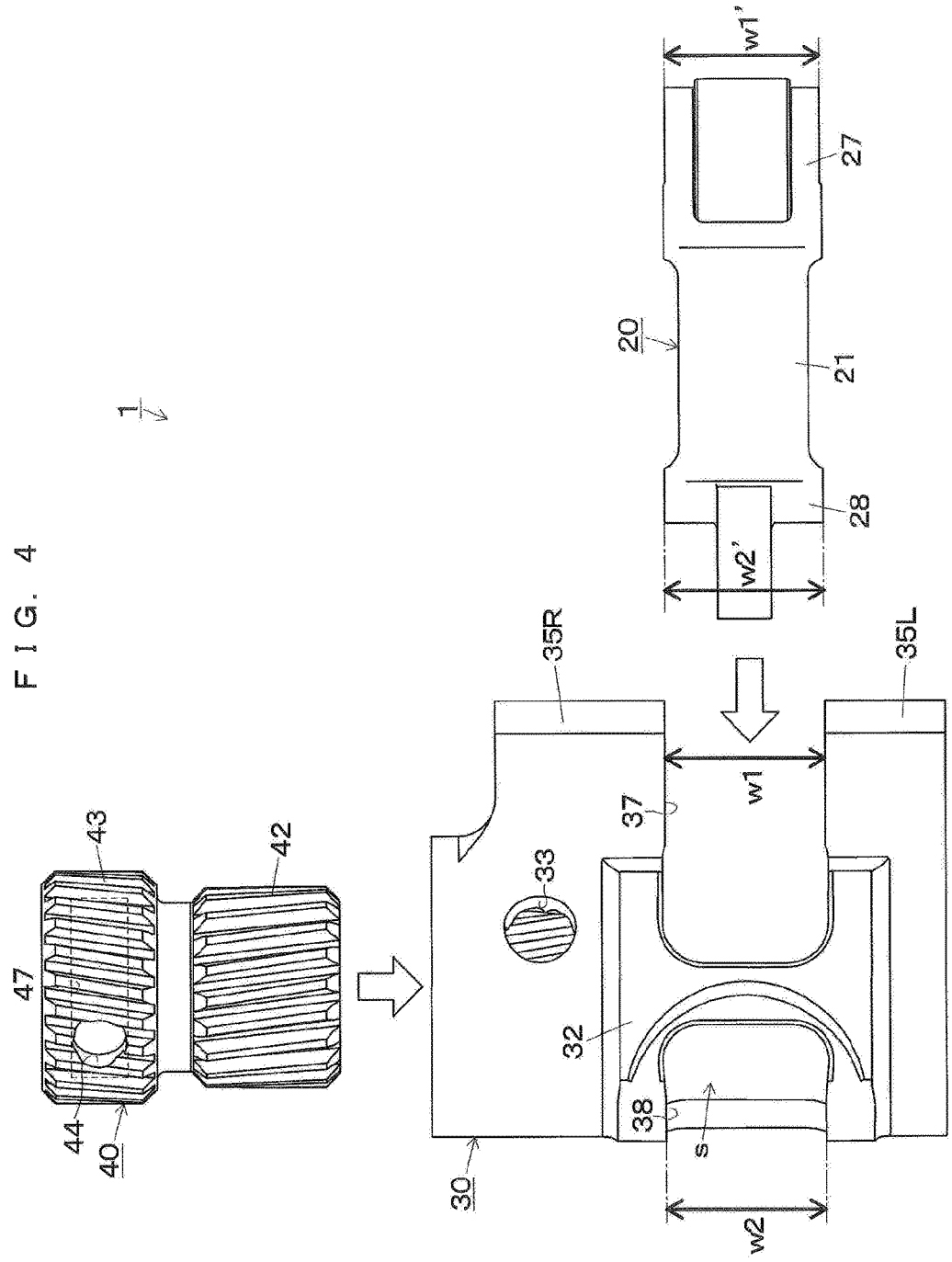

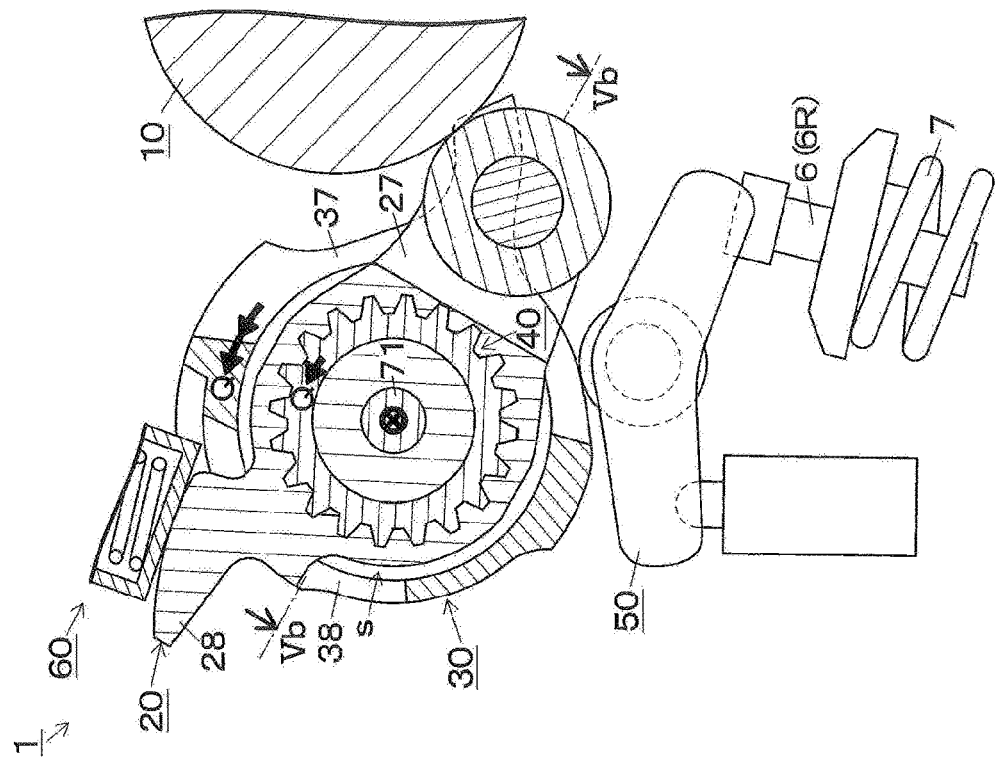
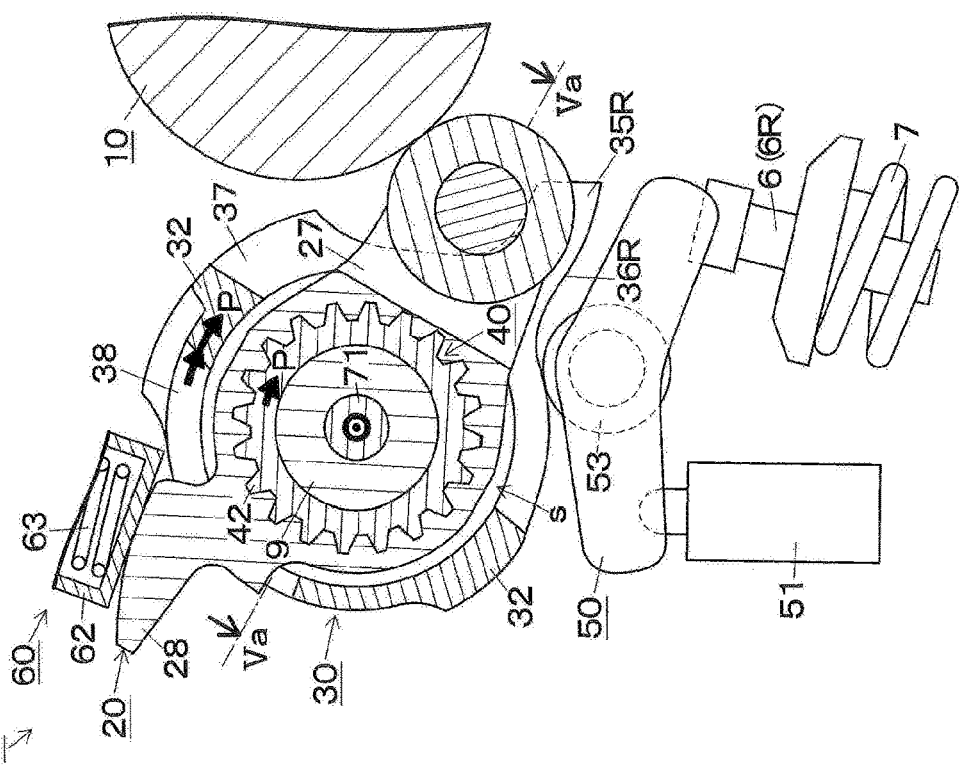

VARIABLE VALVE MECHANISM OF INTERNAL COMBUSTION ENGINE

TECHNICAL FIELD

The present invention relates to variable valve mechanisms that drive a valve of an internal combustion engine and that change the drive state of the valve according to an operating state of the internal combustion engine.

BACKGROUND ART

There are variable valve mechanisms $90a$, $90b$, $90c$ of first to third conventional examples shown in FIGS. 8 to 10. Each of the variable valve mechanisms $90a$, $90b$, $90c$ is configured as follows. Each of the variable valve mechanisms $90a$, $90b$, $90c$ includes an input member 92, an output member 93, a slider 94, and a variable device 97. When driven by a cam 91, the input member 92 swings about a predetermined axis x in the circumferential direction of the axis x (swing direction P, Q). The output member 93 swings together with the input member 92 to drive a valve 6. The slider 94 can be displaced in the longitudinal direction of the axis x (thrust direction L, R) relative to the input member 92 and the output member 93. When displaced in the thrust direction L, R relative to the input member 92 and the output member 93, the slider 94 turns the output member 93 in the swing direction P, Q relative to the input member 92 to change the valve lift amount. The variable device 97 displaces the slider 94 in the thrust direction L, R relative to the input member 92 and the output member 93. A specific configuration of each variable valve mechanism $90a$, $90b$, $90c$ is as follows.

The variable valve mechanism $90a$ of the first conventional example (Patent Document 1) shown in FIG. 8 includes two output members 93, 93 on both sides in the thrust direction L, R of the input member 92. The two output members 93, 93 drive two valves 6, 6.

The variable valve mechanism $90b$ of the second conventional example (Patent Document 2) shown in FIG. 9 includes the output member 93 only on one side in the thrust direction L, R of the input member 92. The variable valve mechanism $90b$ further includes a drive portion $93b$ below the output member 93. The drive portion $93b$ extends in the thrust direction L, R and drives two valves 6, 6.

The variable valve mechanism $90c$ of the third conventional example (Patent Document 3) shown in FIG. 10 includes two output members 93, 93 on both sides in the thrust direction L, R of the input member 92. A single connecting portion $93c$ connecting the two output members 93, 93 is provided radially outward of a tubular portion $92c$ serving as the swing center of the input member 92. The two output members 93, 93 drive two valves 6, 6.

CITATION LIST

Patent Document

[Patent Document 1] Japanese Patent Application Publication No. 2001-263015

[Patent Document 2] Japanese Patent Application Publication No. 2004-027895

[Patent Document 3] Japanese Patent Application Publication No. 2004-183518

SUMMARY OF INVENTION

Technical Problem

In the variable valve mechanism $90a$ of the first conventional example, however, the two output members 93, 93 are provided on both sides in the thrust direction L, R of the input member 92 and are separated from each other. This increases the number of parts of the variable valve mechanism $90a$, and the valve lift amount may vary between the two valves 6, 6.

In the variable valve mechanism $90b$ of the second conventional example, the two valves 6, 6 are driven by the single output member 93. The number of parts of the variable valve mechanism $90b$ is therefore smaller as compared to the case of driving the two valves 6, 6 by the two output members 93, 93 (the first conventional example), and the valve lift amount does not vary between the two valves 6, 6. However, the variable valve mechanism $90b$ is asymmetric as the output member 93 is disposed only on one side in the thrust direction L, R of the input member 92. The input member 92 therefore tends to be tilted with respect to the output member 93 in the lifting operation etc. in which the input member 92 is pressed down by the cam 91. This tilt of the input member 92 with respect to the output member 93 may cause cocking (such that a part of the slider 94 strongly hits the input member 92) when the slider 94 is displaced in the thrust direction relative to the input member 92 and the output member 93. The slider 94 therefore may not be smoothly displaced relative to the input member 92 and the output member 93.

In the variable valve mechanism $90c$ of the third conventional example, the two output members 93, 93 are connected by the connecting portion $93c$ to form a single member. Accordingly, as in the second conventional example, the number of parts of the variable valve mechanism $90c$ is small, and the valve lift amount does not vary between the two valves 6, 6. Unlike the second conventional example, the variable valve mechanism $90c$ is symmetric as the output members 93, 93 are provided on both sides of the input member 92. However, the tubular portion $92c$ of the input member 92 need fit in the region radially inward (on the axis x side) of the connecting portion $93c$ connecting the two output members 93, 93. The tubular portion $92c$ therefore need be small in the radial direction. Accordingly, the input member 92 is more likely to be tilted as compared to the case where the tubular portion $92c$ of the input member 92 can be sufficiently large in the radial direction (the first conventional example). As in the second conventional example, this tilt of the input member 92 may cause cocking (such that a part of the slider 94 strongly hits the input member 92) when the slider 94 is displaced in the thrust direction relative to the input member 92 and the output member 93. The slider 94 therefore may not be smoothly displaced relative to the input member 92 and the output members 93, 93.

It is an object of the present invention to make it difficult for an input member to be tilted with respect to an output member to allow a slider to be smoothly displaced in a thrust direction relative to the input member and the output member.

Solution to Problem

In order to achieve the above object, a variable valve mechanism of the present invention is a variable valve mechanism of an internal combustion engine which includes an input member that, when driven by a cam, swings about a predetermined axis in a circumferential direction of the axis as a swing direction, an output member that swings together with the input member in the swing direction about the axis to drive a valve, a slider that can be displaced in a longitudinal direction of the axis as a thrust direction relative to the input member and the output member, and that, when displaced in the thrust direction relative to the input member and the output member, turns the output member in the swing direction relative to the input member to change a valve lift amount, and a variable device that displaces the slider in the thrust direction relative to the input member and the output member. In the variable valve mechanism, the output member has internal space formed therein and has a first cutout and a second cutout which are formed at two positions separated from each other in the swing direction so as to extend from an outer periphery of the output member to the internal space. The input member is mounted in the internal space so as to extend through both an inner side of the first cutout and an inner side of the second cutout, and is brought into contact with inner side surfaces of the cutouts from both sides in the thrust direction, whereby relative displacement of the input member together with the slider in the thrust direction with respect to the output member is restricted at two positions by the first and second cutouts.

The form of the output member is not particularly limited, but it is preferable to drive two valves by a single output member. This reduces the number of parts of the variable valve mechanism, and the valve lift amount does not vary between the two valves. A specific form of driving two valves by the single output member is as follows although the present invention is not particularly limited to this. The output member includes at two positions separated from each other in the thrust direction a first drive portion that drives one valve and a second drive portion that drives the other valve, and the first and second cutouts are formed between the first drive portion and the second drive portion in the thrust direction.

Advantageous Effects of Invention

According to the present invention, relative displacement of the input member together with the slider in the thrust direction with respect to the output member is restricted at two positions by the first and second cutouts. The input member is therefore less likely to be tilted with respect to the output member. The slider can thus be smoothly displaced in the thrust direction relative to the input member and the output member.

BRIEF DESCRIPTION OF DRAWINGS

FIG. 4 is an exploded plan view showing the variable valve mechanism of the embodiment;

FIG. 6A is a sectional side view showing the case where the valve lift amount is increased by the variable valve mechanism of the embodiment, and FIG. 6B is a sectional side view showing the case where the valve lift amount is reduced by the variable valve mechanism of the embodiment;

DESCRIPTION OF EMBODIMENTS

Figure 1:
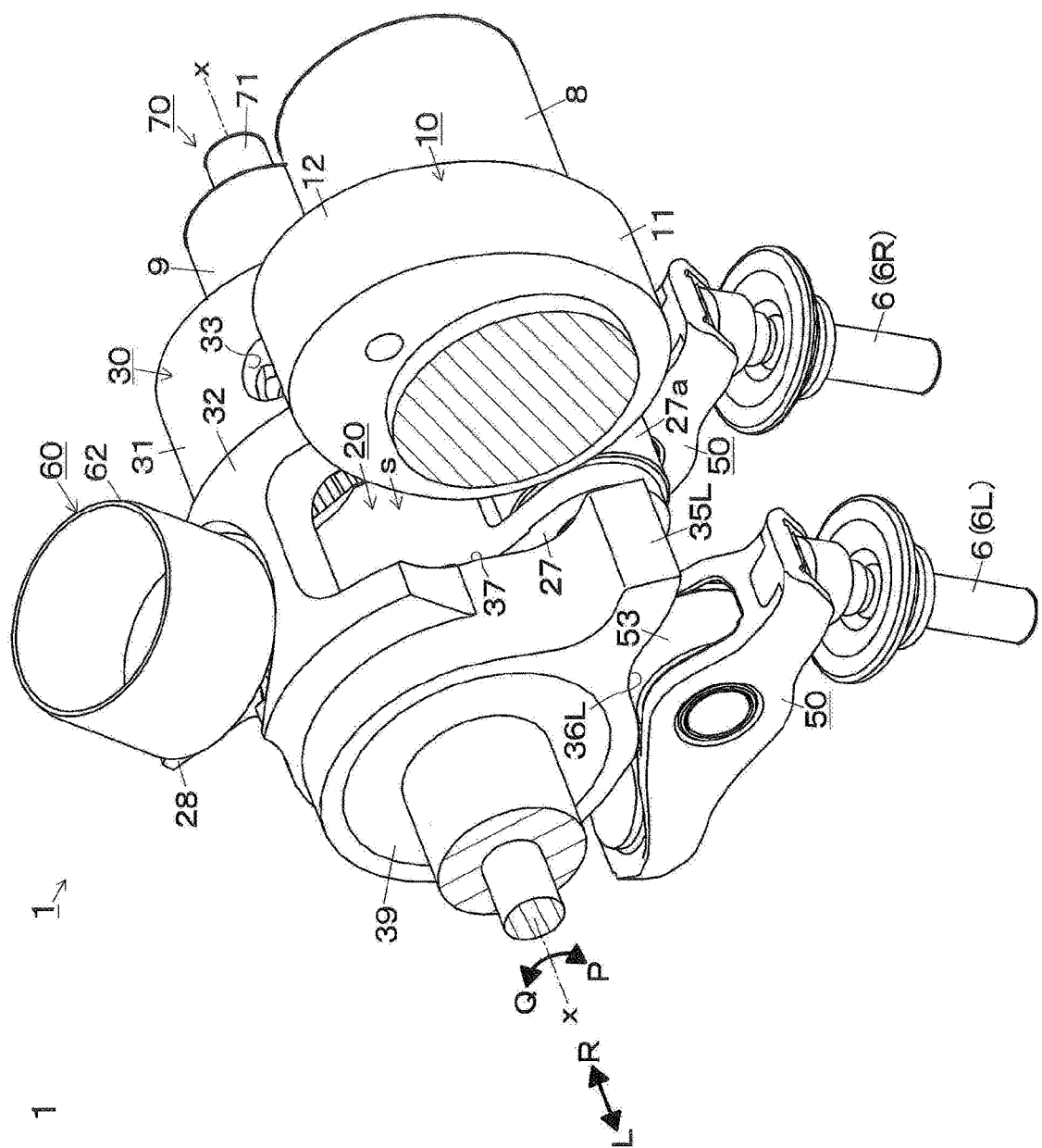
FIG. 1 is a perspective view showing a variable valve mechanism of an embodiment.
Figure 2:
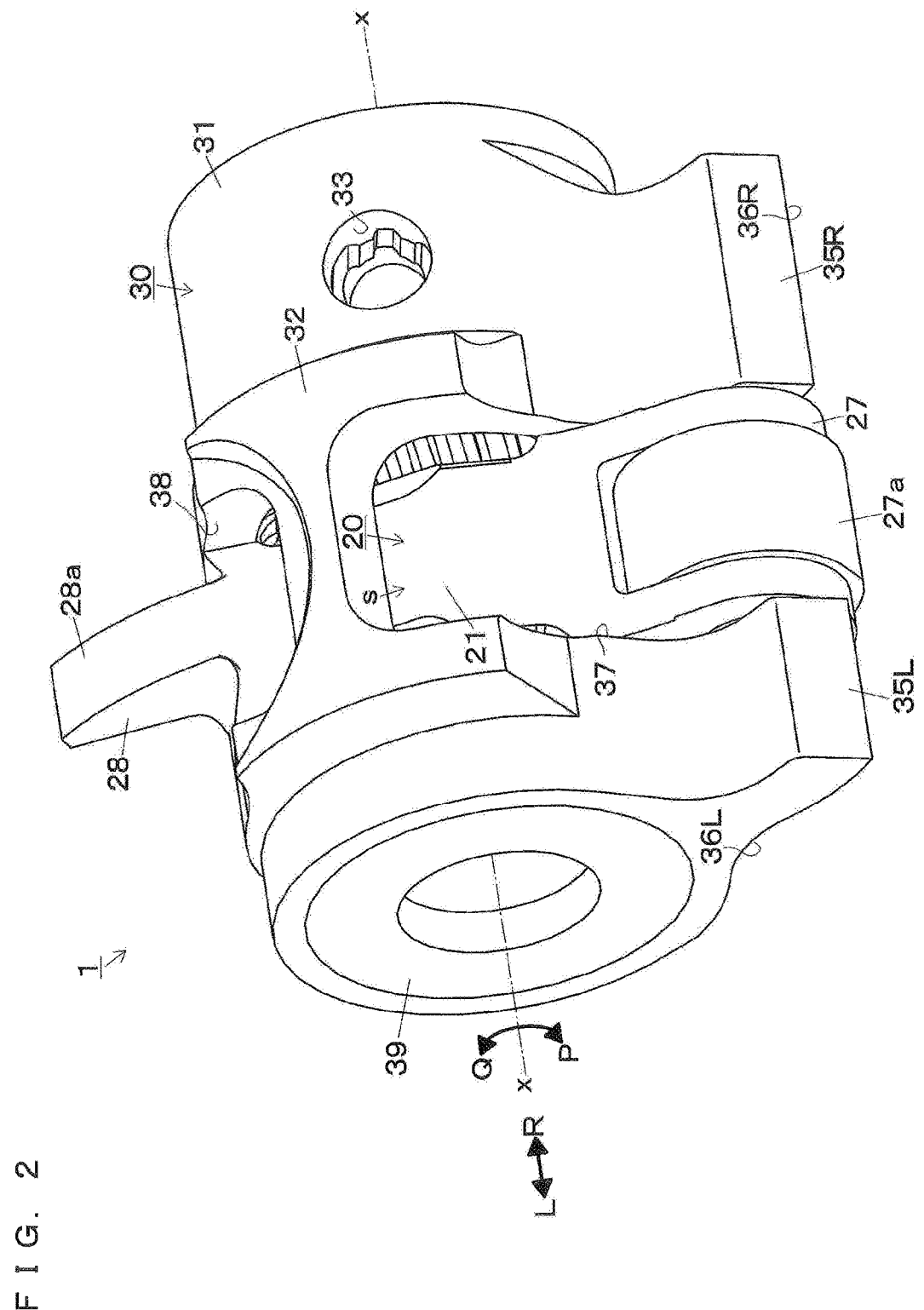
FIG. 2 is a perspective view showing an input member and an output member of the variable valve mechanism of the embodiment.
Figure 3:
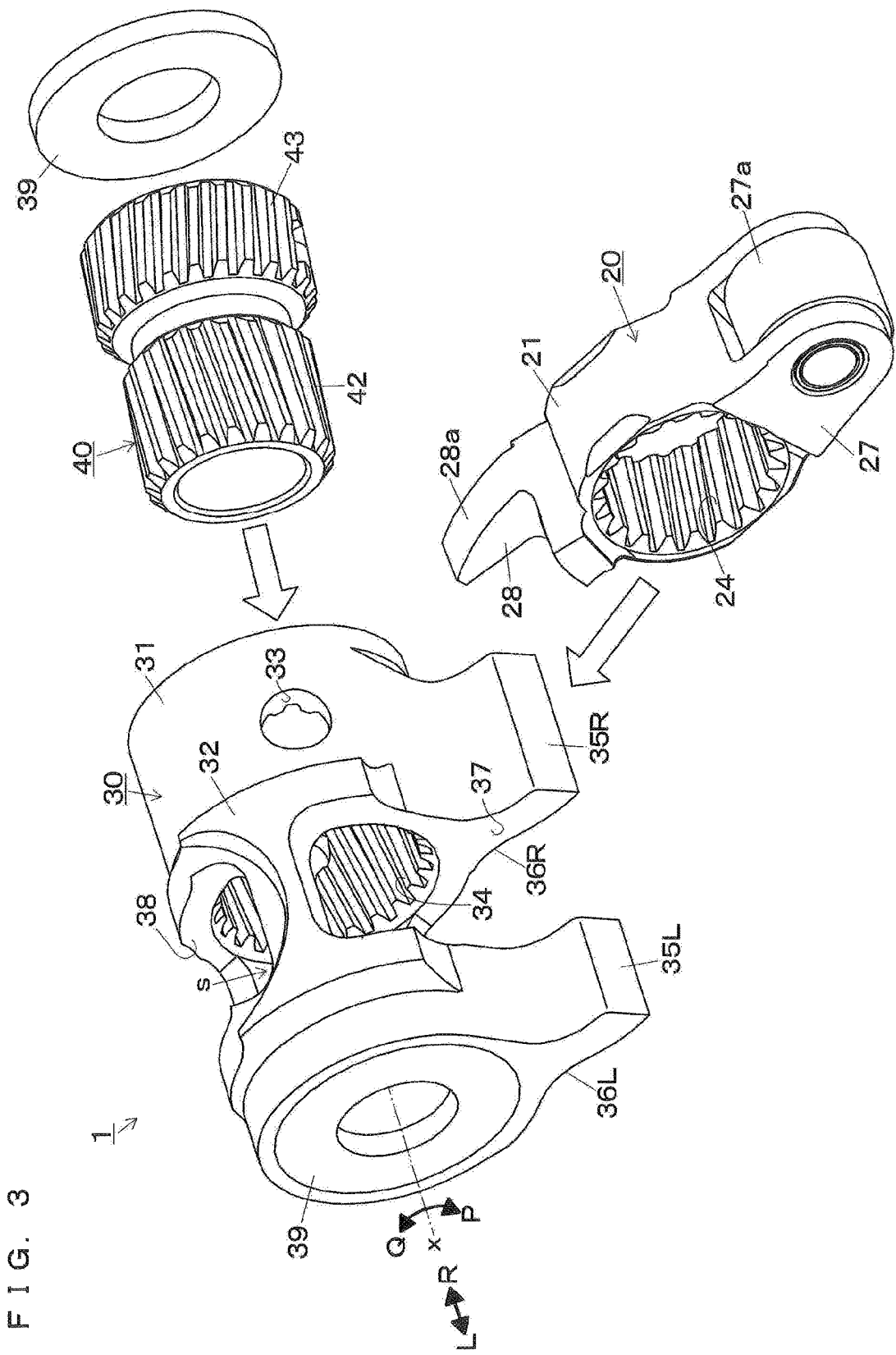
FIG. 3 is an exploded perspective view showing the variable valve mechanism of the embodiment.

The structure that turns the output member relative to the input member when the slider is displaced in the thrust direction relative to the input member and the output member may be in the following forms (i), (ii), although the present invention is not particularly limited to these forms. The form (i) is preferable because the input member and the output member are more firmly engaged with the slider in the form (i).

(i) Each of the input member, the output member, and the slider is a tubular member fitted around the axis. The input member has input portion helical splines on its inner peripheral surface. The output member has, on its inner peripheral surface, output portion helical splines having a different helix angle from the input portion helical splines. The slider has, on its outer peripheral surface, input-side helical splines that mesh with the input portion helical splines, and output-side helical splines that mesh with the output portion helical splines.

(ii) The slider engages with the output member so that the slider can swing together with the output member in the swing direction and the slider can be displaced relative to the output member in the thrust direction. The input member has a tilted portion that is tilted with respect to the thrust direction. The slider turns the output member relative to the input member by pressing the tilted portion when displaced in the thrust direction relative to the input member and the output member.

In the form (i), the shape of the slider is not particularly limited, but it is preferable that the slider have a smaller outside diameter in a portion having the input-side helical splines than in a portion having the output-side helical splines. This can make the input member compact and can thus improve mountability of the input member in the output member (can reduce the internal space of the output member). Further, reduction in internal space can improve strength of the output member.

In the form (i), the amount by which the input member can be tilted due to clearance in the thrust direction between the inner side surface of each cutout and the input member is not particularly limited, but it is preferable that this amount be small. Specifically, it is preferable that the amount by which the input member can be tilted due to the clearance in the thrust direction be equal to or smaller than that by which the input member can be tilted due to backlash of the helical splines (intended clearance between the helical splines). The input member is therefore not tilted by more than the amount by which the input member can be tilted due to the backlash, and cocking between the helical splines (such that part of the helical splines of slider hit strongly the helical splines of the input member or the output member) does not occur.

Embodiment

A variable valve mechanism 1 of an embodiment shown in FIGS. 1 to 6B includes an input member 20, an output member 30, a slider 40, and a variable device 70. When driven by a cam 10, the input member 20 swings about a predetermined axis x in the circumferential direction of the axis x, namely a swing direction P, Q. The output member 30 swings together with the input member 20 in the swing direction P, Q about the axis x to drive valves 6, 6. The slider 40 can be displaced in the longitudinal direction of the axis x, namely a thrust direction L, R, relative to the input member 20 and the output member 30. When displaced in the thrust direction L, R relative to the input member 20 and the output member 30, the slider 40 turns the output member 30 in the swing direction P, Q relative to the input member 20 to change the valve lift amount and the valve open period (operation angle). The variable device 70 displaces the slider 40 in the thrust direction L, R relative to the input member 20 and the output member 30.

The output member 30 includes a first drive portion 36L and a second drive portion 36R at two positions that are separated from each other in the thrust direction L, R. The first drive portion 36L drives one valve 6L, and the second drive portion 36R drives the other valve 6R. The output member 30 has internal space s where the input member 20 is mounted. The output member 30 further has a first cutout 37 and a second cutout 38 at two positions that are separated from each other in the swing direction P, Q. The first and second cutouts 37, 38 are formed between the first and second drive portions 36L, 36R in the thrust direction L, R so as to extend from the outer periphery of the output member 30 to the internal space s.

The input member 20 is mounted in the internal space s so as to extend through both inner sides of the first and second cutouts 37, 38. The input member 20 is brought into contact with the inner side surfaces of the cutouts 37, 38 from both sides in the thrust direction L, R (that is, when the slider 40 is displaced in one thrust direction L, the input member 20 is brought into contact with the inner side surface of the cutout 37 from one side L, and when the slider is displaced in the other thrust direction R, the input member 20 is brought into contact with the inner side surface of the cutout 38 from the other side R). Relative displacement of the input member 20 together with the slider 40 in the thrust direction L, R with respect to the output member 30 is thus restricted at two positions by the first and second cutouts 37, 38.

Specifically, the variable valve mechanism 1 of the present embodiment includes the cam 10, the input member 20, the output member 30, the slider 40, rocker arms 50, a lost motion mechanism 60, and the variable device 70, as described below. A valve spring 7 is provided for each valve 6 (6L, 6R). Each valve spring 7 biases a corresponding one of the valves 6L, 6R in a direction in which the valve 6L, 6R is closed. In the following description, one thrust direction L, R is referred to as the left direction L or the left side L, and the opposite direction thereto is referred to as the right direction R or the right side R. One swing direction P, Q (the direction in which the valve 6 is lifted) is referred to as the lift direction P, and the opposite direction thereto is referred to as the return direction Q.

[Cam 10]

The cam 10 is provided on a camshaft 8 extending in the thrust direction L, R. The camshaft 8 rotates according to rotation of an internal combustion engine, and the cam 10 rotates together with the camshaft 8. The cam 10 includes a base circle portion 11 having a circular section, and a nose 12 protruding from the base circle portion 11.

[Input Member 20]

The input member 20 includes a tubular portion 21 provided on the axis x (fitted around the axis x), a first protruding portion 27 protruding forward from the tubular portion 21, and a second protruding portion 28 protruding rearward from the tubular portion 21.

The tubular portion 21 of the input member 20 has input portion helical splines 24 on its inner peripheral surface. The input portion helical splines 24 are twisted in one direction (twisted to slant in the lift direction P toward the left side L). The outside diameter of the tubular portion 21 of the input member 20 is equal to or smaller than the inside diameter of a tubular portion 31 of the output member 30 (the inside diameter of the internal space s). The tubular portion 21 of the input member 20 is mounted in the inner side of the tubular portion 31 (internal space s) of the output member 30. The axis of the input member 20 and the axis of the output member 30 match the axis x.

A roller 27a that contacts the cam 10 from below is rotatably supported by the front end of the first protruding portion 27. A contact surface 28a that contacts the lost motion mechanism 60 is provided on the upper surface of the rear end of the second protruding portion 28.

[Output Member 30]

The output member 30 includes the tubular portion 31 provided on the axis x (fitted around the axis x), a first nose 35L protruding forward from the left part of the tubular portion 31, a second nose 35R protruding forward from the right part of the tubular portion 31, and the first and second cutouts 37, 38 formed between the first and second noses 35L, 35R in the thrust direction L, R.

The tubular portion 31 of the output member 30 has output portion helical splines 34 on its inner peripheral surface. The output portion helical splines 34 are twisted in the other direction (twisted to slant in the lift direction P toward the right side R). The tubular portion 31 has a hole 33 in which an engagement pin 72 of the variable device 70 is inserted when assembling the variable valve mechanism 1. The lower surface of the first nose 35L and a part of the outer peripheral surface of the tubular portion 31 which is located near the lower surface of the first nose 35L form the first drive portion 36L. The lower surface of the second nose 35R and apart of the outer peripheral surface of the tubular portion 31 which is located near the lower surface of the second nose 35R form the second drive portion 36R.

The first and second cutouts 37, 38 are formed longer in the swing direction P, Q so that the input member 20 can turn in the swing direction P, Q relative to the output member 30. The output member 30 has reinforcing portions 32, 32 in parts of the tubular portion 31 which are located between the first and second cutouts 37, 38. The reinforcing portions 32, 32 are thicker in the radial direction than the remaining part of the tubular portion 31.

The width w1 in the thrust direction L, R of the first cutout 37 or the distance in the thrust direction L, R between the inner side surfaces of the first cutout 37 is substantially the same as the width w1' in the thrust direction L, R of the first protruding portion 27 of the input member 20 (to be exact, slightly larger than the width w1' by the amount corresponding to predetermined first thrust clearance). The width w2 in the thrust direction L, R of the second cutout 38 or the distance in the thrust direction L, R between the inner side surfaces of the second cutout 38 is substantially the same as the width w2' in the thrust direction L, R of the second protruding portion 28 of the input member 20 (to be exact, slightly larger than the width w2' by the amount corresponding to predetermined second thrust clearance). The inner side surfaces in the thrust direction L, R of the inner side of the first cutout 37 serve as a front receiving portion that restricts relative displacement of the front part of the input member 20 with respect to the front part of the output member 30 in the thrust direction L, R. The inner side surfaces in the thrust direction L, R of the inner side of the second cutout 38 serve as a rear receiving portion that restricts relative displacement of the rear part of the input member 20 with respect to the rear part of the output member 30 in the thrust direction L, R. More specifically, in the present embodiment, the width w1 of the first cutout 37 is the same as the width w2 of the second cutout 38, and the width w1' of the first protruding portion 27 is the same as the width w2' of the second protruding portion 28.

The amount by which the input member 20 can be tilted due to the first thrust clearance (clearance in the thrust direction L, R between the inner side surface of the first cutout 37 and the first protruding portion 27) and the second thrust clearance (clearance in the thrust direction L, R between the inner side surface of the second cutout 38 and the second protruding portion 28) is equal to or smaller than that by which the input member 20 can be tilted due to backlash of the helical splines 24, 34, 42, 43 (intended clearance between the helical splines).

Disc-shaped end plates 39, 39 each having a hole in its center are attached to the right and left ends of the output member 30. The end plates 39, 39 contact standing walls 5, 5 on both sides in the thrust direction L, R of the output member 30 with shims 79, 79 interposed therebetween. This restricts displacement of the output member 30 in the thrust direction L, R.

[Slider 40]

The slider 40 is a tubular member provided on the axis x (fitted around the axis x). The slider 40 has an engagement groove 47 formed on its inner peripheral surface so as to extend in the swing direction P, Q. The inner side surfaces on both sides in the thrust direction L, R of the engagement groove 47 are slide-contact surfaces that side-contact a bush 73 of the variable device 70. The slider 40 has the input-side helical splines 42 and the output-side helical splines 43 on its outer peripheral surface. The input-side helical splines 42 mesh with the input portion helical splines 24, and the output-side helical splines 43 mesh with the output portion helical splines 34. The slider 40 has a smaller outside diameter in the portion having the input-side helical splines 42 than in the portion having the output-side helical splines 43. The slider 40 has a hole 44 in which the engagement pin 72 of the variable device 70 is inserted when assembling the variable valve mechanism 1.

The slider 40 and the end plates 39, 39 of the output member 30 are fitted on a single pipe-shaped support shaft 9 that is provided on the axis x (fitted around the axis x) so as to extend in the thrust direction L, R. The slider 40 and the end plates 39, 39 of the output member 30 are thus supported by the support shaft 9. The support shaft 9 has a long hole 9a in the part supporting the slider 40. The long hole 9a extends in the thrust direction L, R.

[Rocker Arms 50, 50]

One of the rocker arms 50, 50 is interposed between the first drive portion 36L and the one valve 6L, and the other rocker arm 50 is interposed between the second drive portion 36R and the other valve 6R. Each rocker arm 50 has its rear end supported by a lash adjuster 51 so that the rocker arm 50 can swing. Each rocker arm 50 rotatably supports a roller 53 in its intermediate part in the longitudinal direction, and the lower surface of the front end of each rocker arm 50 contacts a corresponding one of the valves 6L, 6R. The rollers 53, 53 of the rocker arms 50, 50 contact the first drive portion 36L and the second drive portion 36R from below.

[Lost Motion Mechanism 60]

The lost motion mechanism 60 is a mechanism that biases the input member 20 in the return direction Q. The lost motion mechanism 60 includes a tubular body (not shown), a lifter 62, and a spring 63. The body opens downward. The upper part of the lifter 62 is inserted in the body, and the lower surface of the lifter 62 contacts the contact surface 28a of the second protruding portion 28 of the input member 20. The spring 63 is interposed between the body and the lifter 62.

[Variable Device 70]

The variable device 70 includes a control shaft 71 and a displacement device (not shown). The control shaft 71 is a shaft inserted in the pipe-shaped support shaft 9 and extending in the thrust direction L, R. The engagement pin 72 protruding in the radial direction from the control shaft 71 is inserted through the long hole 9a of the support shaft 9 and engages with the engagement groove 47 of the slider 40 (more specifically, the inner side surfaces on both sides in the thrust direction L, R of the engagement groove 47 extending in the swing direction P, Q) via the bush 73. Accordingly, the slider 40 can be displaced together with the control shaft 71 in the thrust direction L, R, and can be swung relative to the control shaft 71 in the swing direction P, Q.

The displacement device (not shown) is a device that displaces the control shaft 71 in the thrust direction L, R. For example, the displacement device may be an electromagnetic displacement device that displaces the control shaft 71 in the thrust direction L, R by an electromagnetic force, a hydraulic displacement device that displaces the control shaft 71 by an oil pressure, or a pneumatic displacement device that displaces the control shaft 71 by the pressure of the air.

Figure 5A:
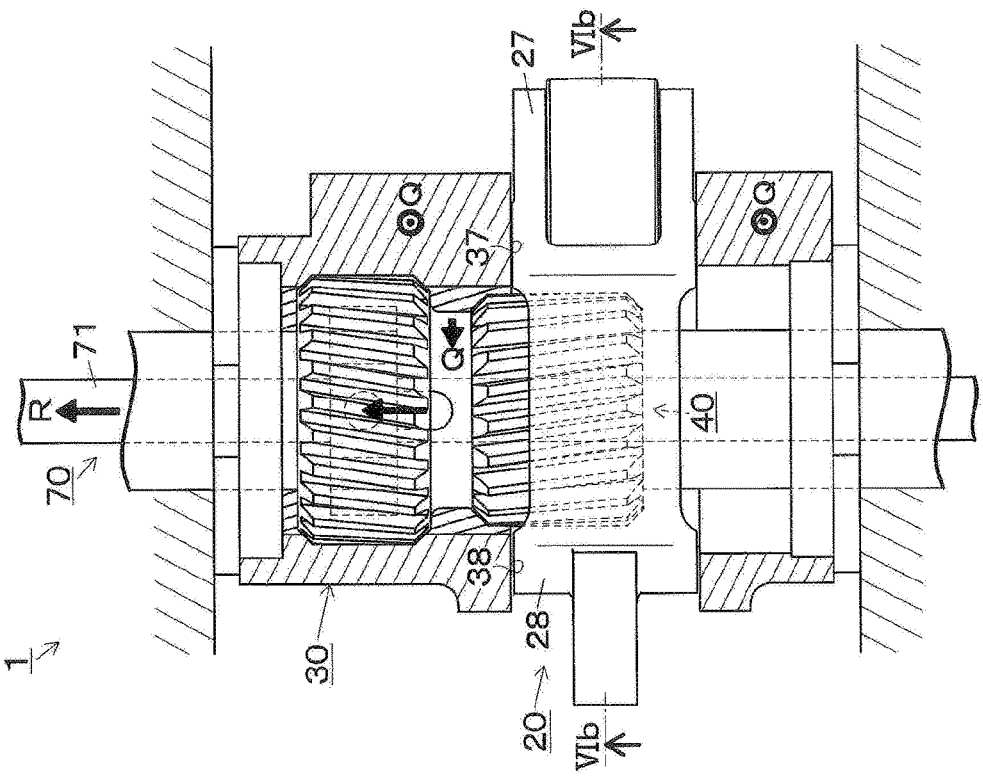
FIG. 5A is a partially sectional plan view showing the case where the valve lift amount is increased by the variable valve mechanism of the embodiment.

As shown in FIGS. 5A and 6A, when the control shaft 71 is displaced in the left direction L, the output member 30 turns in the lift direction P with respect to the input member 20 to increase the lift amount of the valves 6L, 6R. Specifically, at this time, the slider 40 turns in the lift direction P with respect to the input member 20, and the output member 30 further turns in the lift direction P with respect to the slider 40. The output member 30 therefore turns in the lift direction P with respect to the input member 20 by the amount corresponding to the sum of the amount by which the slider 40 turns with respect to the input member 20 and the amount by which the output member 30 turns with respect to the slider 40.

Figure 5B:
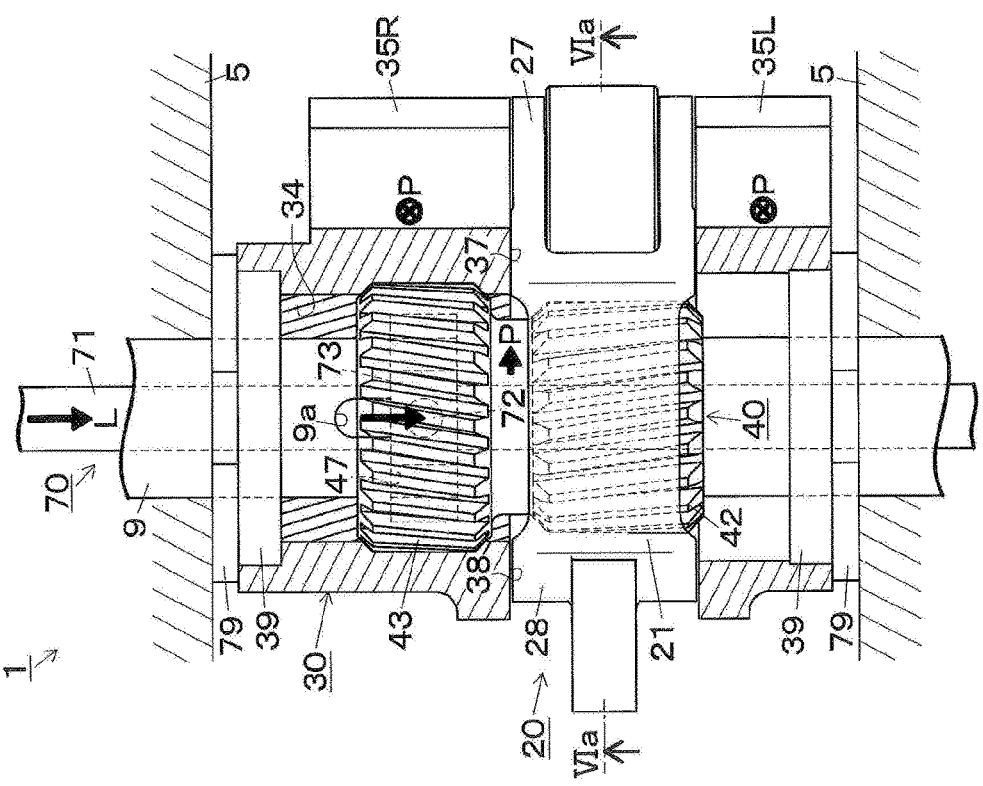
FIG. 5B is a partially sectional plan view showing the case where the valve lift amount is reduced by the variable valve mechanism of the embodiment.

As shown in FIGS. 5B and 6B, when the control shaft 71 is displaced in the right direction R, the output member 30 turns in the return direction Q with respect to the input member 20 to reduce the lift amount of the valves 6L, 6R. Specifically, at this time, the slider 40 turns in the return direction Q with respect to the input member 20, and the output member 30 further turns in the return direction Q with respect to the slider 40. The output member 30 therefore turns in the return direction Q with respect to the input member 20 by the amount corresponding to the sum of the amount by which the slider 40 turns with respect to the input member 20 and the amount by which the output member 30 turns with respect to the slider 40.

The present embodiment has the following effects (A) to (D).

Figure 7A:
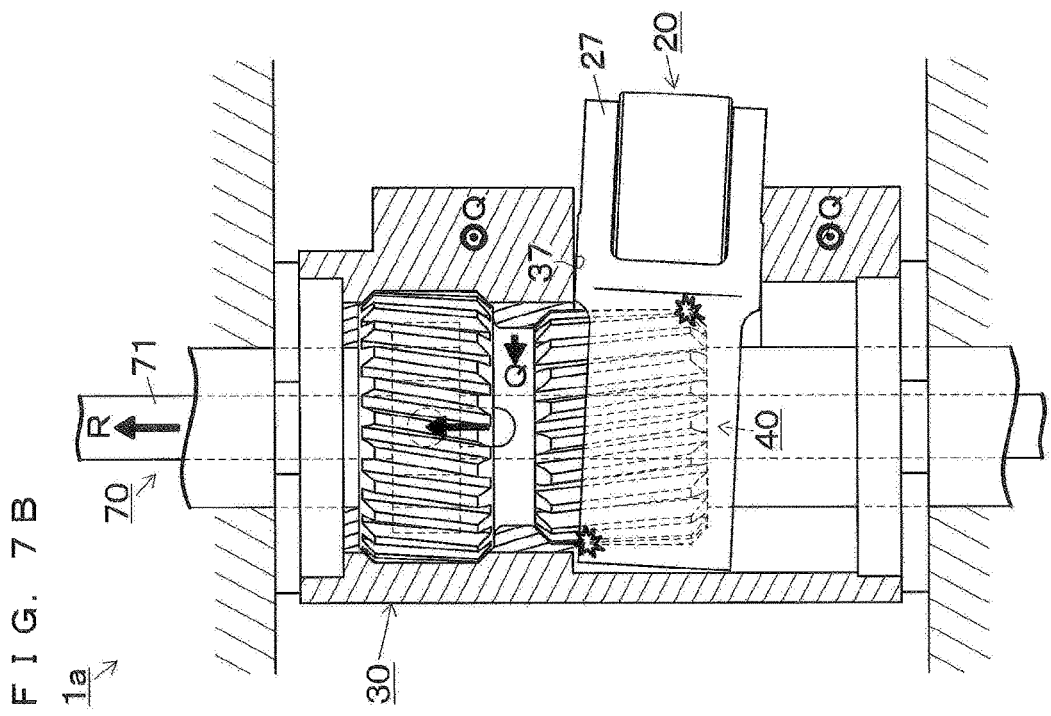
FIG. 7A is a partially sectional plan view showing the case where the valve lift amount is increased by a variable valve mechanism of a comparative example.
Figure 7B:
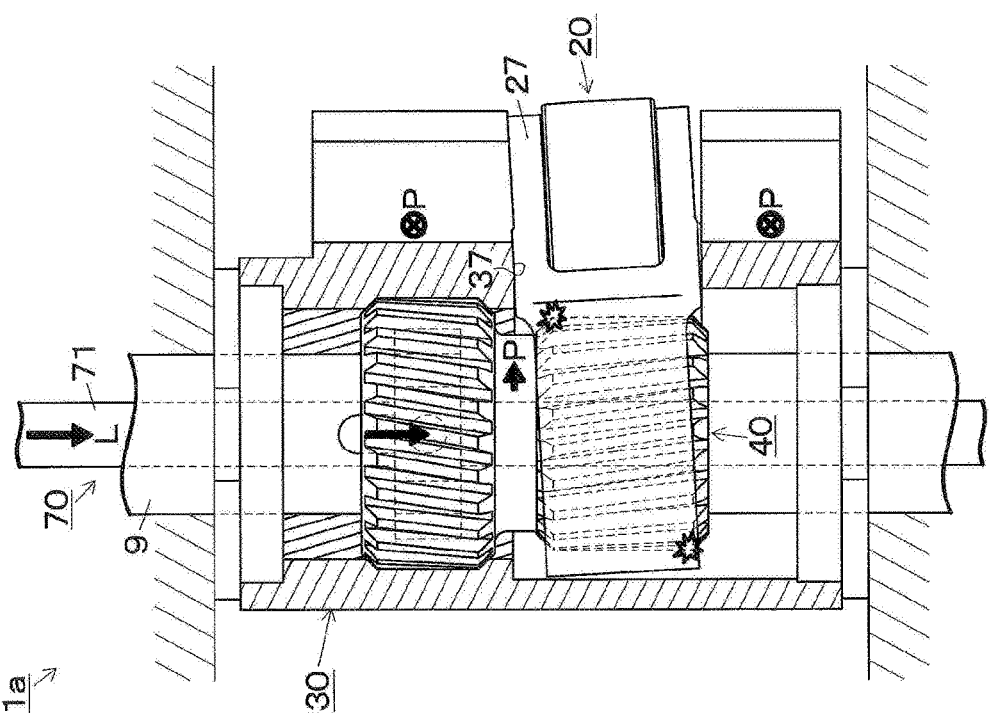
FIG. 7B is a partially sectional plan view showing the case where the valve lift amount is reduced by the variable valve mechanism of the comparative example.
Figure 8:
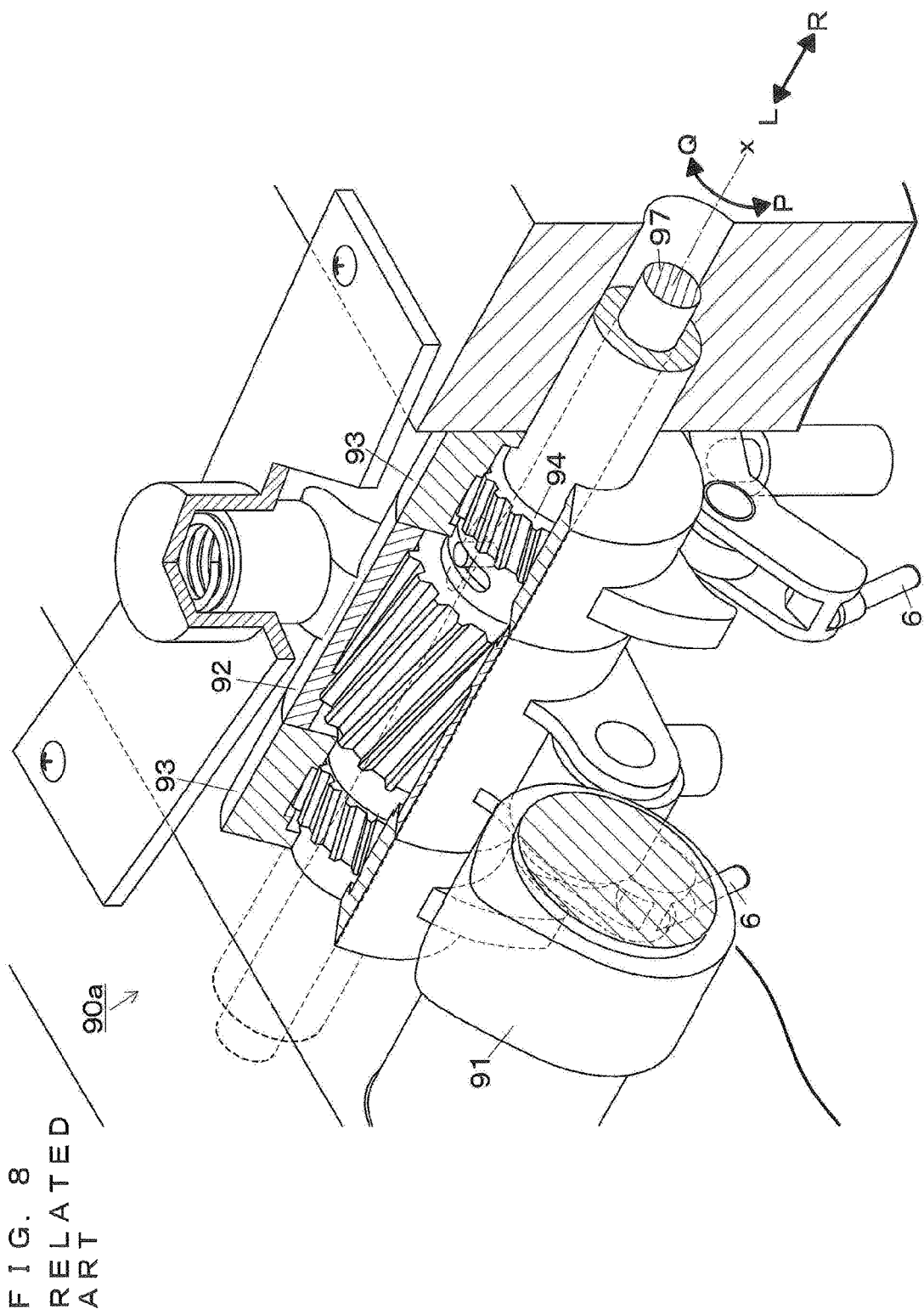
FIG. 8 is a perspective view showing a variable valve mechanism of a first conventional example.
Figure 9:
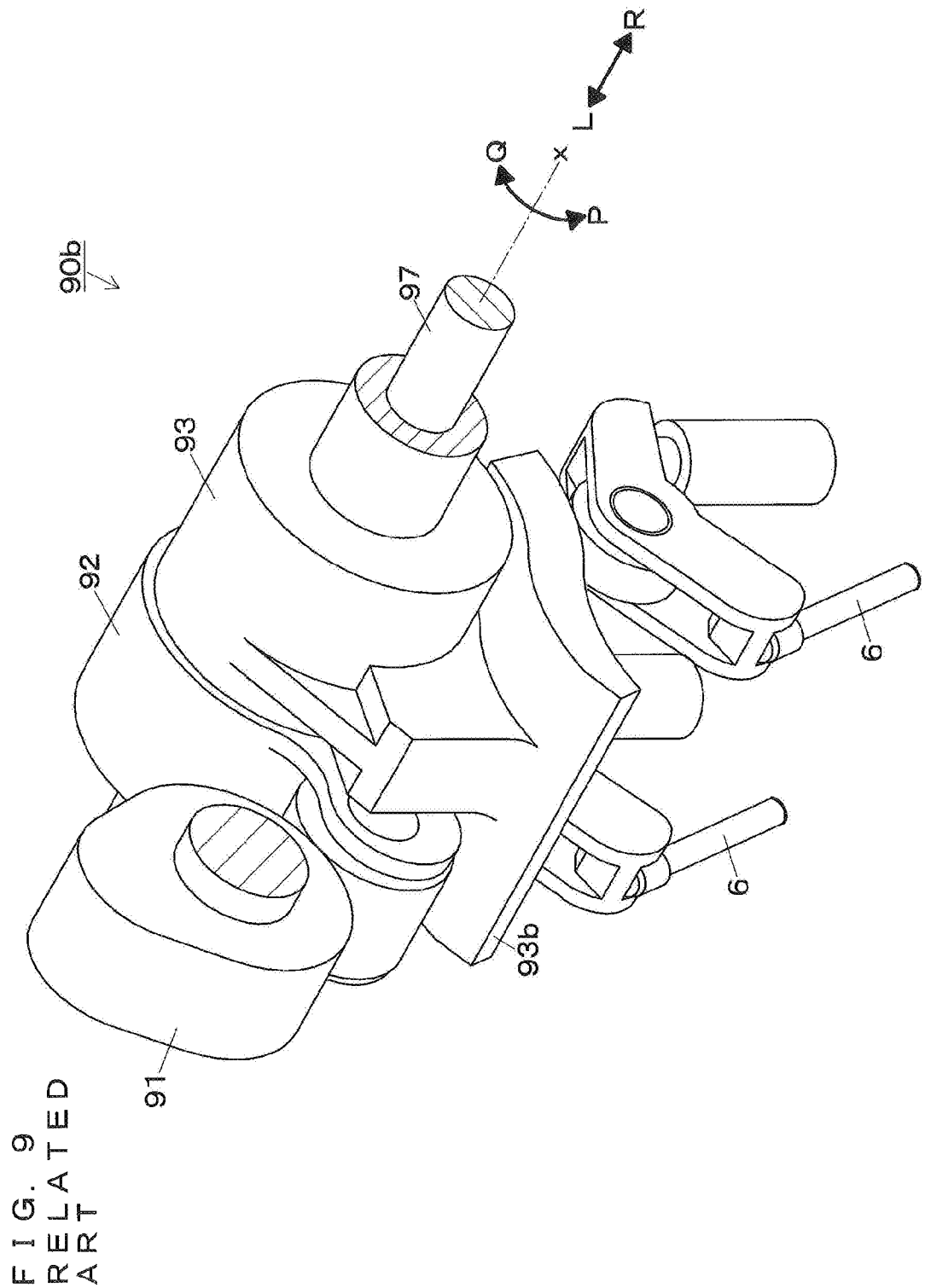
FIG. 9 is a perspective view showing a variable valve mechanism of a second conventional example.
Figure 10:
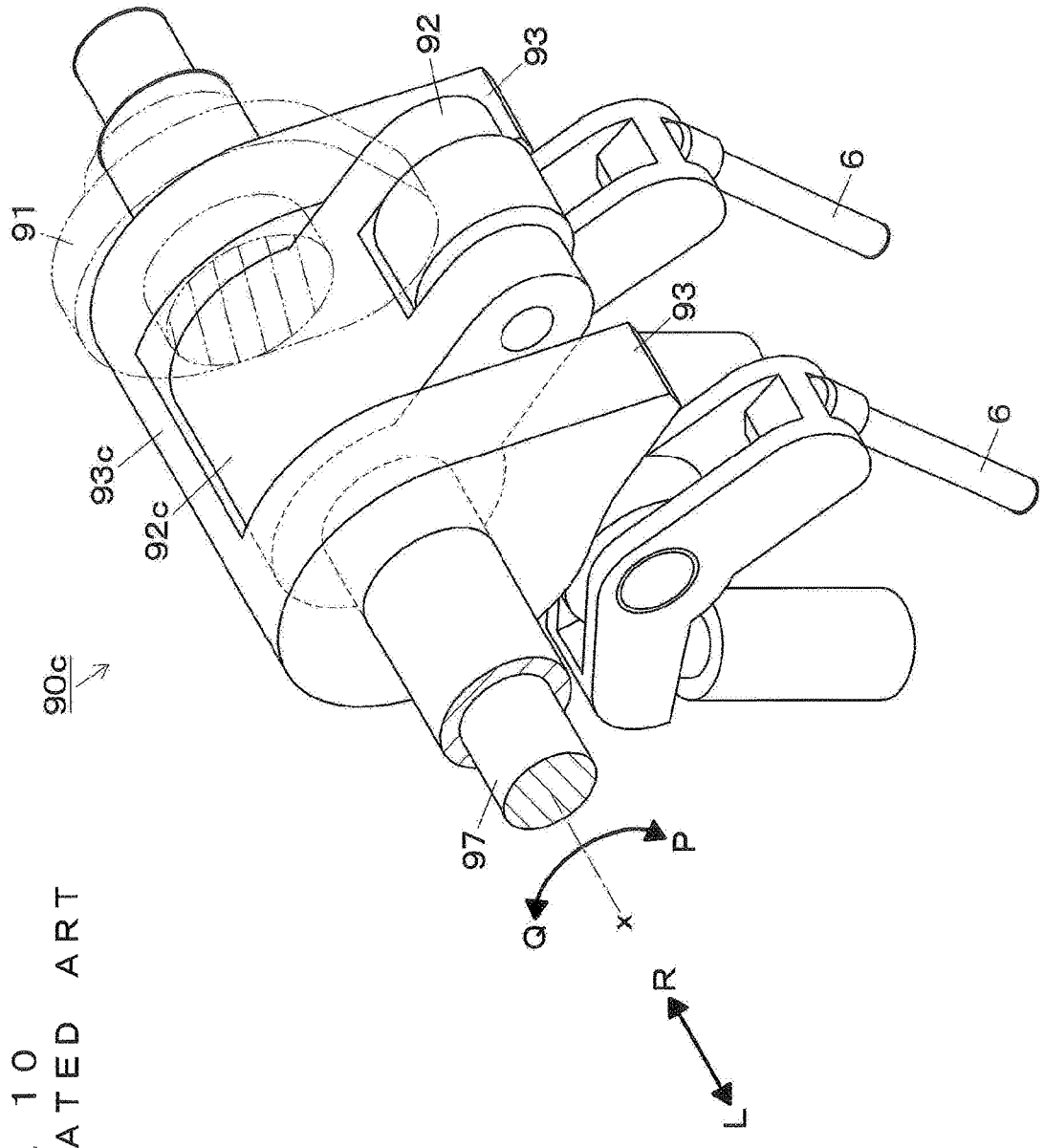
FIG. 10 is a perspective view showing a variable valve mechanism of a third conventional example.

(A) Relative displacement of the input member 20 together with the slider 40 in the thrust direction L, R with respect to the output member 30 is restricted at two positions by the first and second cutouts 37, 38. The input member 20 is therefore less likely to be tilted with respect to the output member 30 as shown in FIGS. 5A and 5B as compared to the case where the output member 30 does not have the second cutout 38 and the relative displacement is restricted at only one position by the first cutout 37 as in a variable valve mechanism 1a of a reference example shown in FIGS. 7A and 7B. The slider 40 can thus be smoothly displaced in the thrust direction L, R relative to the input member 20 and the output member 30.

(B) Since the two valves 6, 6 are driven by the single output member 30, the number of parts of the variable valve mechanism 1 is small and the valve lift amount does not vary between the two valves 6, 6.

(C) The slider 40 has a smaller outside diameter in the portion having the input-side helical splines 42 than in the portion having the output-side helical splines 43. This can make the tubular portion 21 of the input member 20 compact and can thus improve mountability of the input member 20 in the output member 30 (can reduce the internal space s of the output member 30). Further, reduction in internal space s can improve strength of the output member 30.

(D) The amount by which the input member 20 can be tilted due to the first thrust clearance between the inner side surface of the first cutout 37 of the output member 30 and the input member 20 and the second thrust clearance between the inner side surface of the second cutout 38 of the output member 30 and the input member 20 is equal to or smaller than that by which the input member 20 can be tilted due to the backlash of the helical splines 24, 34, 42, 43. The input member 20 is therefore not tilted by more than the amount by which the input member 20 can be tilted due to the backlash, and cocking between the helical splines 24, 34, 42, 43 (such that part of the helical splines 42, 43 strongly hit the helical splines 24, 34) does not occur.

The present invention is not limited to the configuration of the above embodiment, and it may be modified as desired without departing from the spirit and scope of the invention.

REFERENCE SIGNS LIST

1 Variable valve mechanism
6 Valve
6L One valve
6R Other valve
10 Cam
20 Input member
24 Input portion helical spline
30 Output member
34 Output portion helical spline
36L First drive portion
36R Second drive portion
37 First cutout
38 Second cutout
40 Slider
42 Input-side helical spline
43 Output-side helical spline
70 Variable Device
x Axis
s Internal space
L Left direction or Left side (One thrust direction)
R Right direction or Right side (Opposite thrust direction)
P Lift direction (One swing direction)
Q Return direction (Opposite swing direction)

The invention claimed is:

1. A variable valve mechanism of an internal combustion engine, the variable valve mechanism comprising:
   an input member that, when driven by a cam, swings about a predetermined axis in a circumferential direction of the axis as a swing direction;
   an output member that swings together with the input member in the swing direction about the axis to drive a valve;
   a slider that is configured to be displaced in a longitudinal direction of the axis as a thrust direction relative to the input member and the output member, and that, when displaced in the thrust direction relative to the input member and the output member, turns the output member in the swing direction relative to the input member to change a valve lift amount; and
   a variable device that displaces the slider in the thrust direction relative to the input member and the output member,
   wherein the output member has internal space formed therein and includes a first cutout and a second cutout which are formed at two positions separated from each other in the swing direction so as to extend from an outer periphery of the output member to the internal space,
   wherein the input member is mounted in the internal space so as to extend through both an inner side of the first cutout and an inner side of the second cutout, and is brought into contact with inner side surfaces of the cutouts from both sides in the thrust direction, whereby a relative displacement of the input member together with the slider in the thrust direction with respect to the output member is restricted at two positions by the first cutout and the second cutout,
   wherein the output member includes a tubular portion having the internal space formed therein, a first nose protruding forward from a left part of the tubular portion, and a second nose protruding forward from a right part of the tubular portion, and the first cutout and the second cutout are formed between the first nose and the second nose in the thrust direction, and
   wherein the output member includes two reinforcing portions in parts of the tubular portion which are located between the first cutout and the second cutout.

2. The variable valve mechanism of the internal combustion engine according to claim 1, wherein the two reinforcing portions are thicker in a radial direction than a remaining part of the tubular portion.

3. The variable valve mechanism of the internal combustion engine according to claim 1, wherein the output member includes at two positions separated from each other in the thrust direction a first drive portion that drives one valve and a second drive portion that drives an other valve, and the first cutout and the second cutout are formed between the first drive portion and the second drive portion in the thrust direction.

4. The variable valve mechanism of the internal combustion engine according to claim 1, wherein each of the input member, the output member, and the slider includes a tubular member fitted around the axis,
   wherein the input member includes input portion helical splines on an inner peripheral surface of the input member, wherein the output member includes, on an inner peripheral surface of the output member, output portion helical splines having a different helix angle from the input portion helical splines, and wherein the slider includes, on an outer peripheral surface of the slider, input-side helical splines that mesh with the input portion helical splines, and output-side helical splines that mesh with the output portion helical splines, and the slider has a smaller outside diameter in a portion having the input-side helical splines than in a portion having the output-side helical splines.

5. The variable valve mechanism of the internal combustion engine according to claim 3, wherein each of the input member, the output member, and the slider includes a tubular member fitted around the axis, wherein the input member includes input portion helical splines on an inner peripheral surface of the input member, wherein the output member includes, on an inner peripheral surface of the output member, output portion helical splines having a different helix angle from the input portion helical splines, and wherein the slider includes, on an outer peripheral surface of the slider, input-side helical splines that mesh with the input portion helical splines, and output-side helical splines that mesh with the output portion helical splines, and the slider has a smaller outside diameter in a portion having the input-side helical splines than in a portion having the output-side helical splines.

6. The variable valve mechanism of the internal combustion engine according to claim 1, wherein a lower surface of the first nose and a part of an outer peripheral surface of the tubular portion, which is located near the lower surface of the first nose, form a first drive portion that drives one valve, and a lower surface of the second nose and a part of the outer peripheral surface of the tubular portion, which is located near the lower surface of the second nose, form a second drive portion that drives an other valve.

* * * * *